US010066628B2

(12) United States Patent
Mueller et al.

(10) Patent No.: US 10,066,628 B2
(45) Date of Patent: Sep. 4, 2018

(54) FAN UNIT WITH HEAT TRANSFERRING CONNECTION

(71) Applicant: Robert Bosch GmbH, Stuttgart (DE)

(72) Inventors: Andreas Mueller, Eberdingen (DE); Andreas Schiel, Gernsbach-Lautenbach (DE); Ludger Adrian, Buehl (DE); Harald Eisenhardt, Rutesheim (DE); Bernd Kilast, Rutesheim (DE); Christian Franz, Buehl (DE); Matthias Ludwig, Sinzheim (DE)

(73) Assignee: Robert Bosch GmbH, Stuttgart (DE)

( * ) Notice: Subject to any disclaimer, the term of this patent is extended or adjusted under 35 U.S.C. 154(b) by 911 days.

(21) Appl. No.: 13/628,798

(22) Filed: Sep. 27, 2012

(65) Prior Publication Data
US 2013/0084197 A1 Apr. 4, 2013

(30) Foreign Application Priority Data
Sep. 30, 2011 (DE) .......................... 10 2011 083 925

(51) Int. Cl.
| F04D 17/16 | (2006.01) |
| H02K 7/14 | (2006.01) |
| F04D 25/08 | (2006.01) |
| F04D 29/58 | (2006.01) |

(Continued)

(52) U.S. Cl.
CPC ........... *F04D 17/16* (2013.01); *F04D 25/082* (2013.01); *F04D 29/5806* (2013.01); *F04D 29/5813* (2013.01); *H02K 5/225* (2013.01); *H02K 7/14* (2013.01); *H02K 11/33* (2016.01)

(58) Field of Classification Search
CPC .... F04D 25/081; F04D 29/58; F04D 29/5806; F04D 29/5813; F04D 25/08; F04D 29/581311; F04D 25/082; F04D 17/16; H02K 5/225; H02K 11/0073; H02K 7/14
USPC .... 417/366, 423.14, 423.7, 423.1, 370, 369, 417/423.8; 310/63, 66
See application file for complete search history.

(56) References Cited

U.S. PATENT DOCUMENTS

| 2,119,398 A | * | 5/1938 | Morse ............................... 416/5 |
| 4,515,538 A | * | 5/1985 | Shih ............................. 417/572 |
| 5,336,046 A | | 8/1994 | Hashimoto et al. |

(Continued)

FOREIGN PATENT DOCUMENTS

| CN | 86103343 | 12/1986 |
| CN | 1727688 A | 2/2006 |

(Continued)

Primary Examiner — Kenneth J Hansen
Assistant Examiner — Benjamin Doyle
(74) Attorney, Agent, or Firm — Michael Best & Friedrich LLP

(57) ABSTRACT

A fan unit (1), in particular for an air conditioning system of a motor vehicle, comprising an electric motor (2) for driving a fan wheel (3), an electronic device (7) which generates waste heat and provides electrical current to the electric motor (2) and a fan housing (6), wherein the fan wheel (3) is disposed together with the electric motor (2) in an air guiding region (5) delimited by the fan housing (6). Provision is thereby made for the electronic device (7) to be fastened to the side of the fan housing (6) which faces away from the air guiding region (5) in a heat transferring manner so that a heat transfer connection is formed between the electronic device (7) and the air guiding region (5).

13 Claims, 3 Drawing Sheets

(51) Int. Cl.
*H02K 5/22* (2006.01)
*H02K 11/33* (2016.01)

(56) References Cited

U.S. PATENT DOCUMENTS

| | | | |
|---|---|---|---|
| 5,834,869 A * | 11/1998 | Morgan et al. | 310/89 |
| 6,183,222 B1 * | 2/2001 | Izzo et al. | 417/423.14 |
| 6,951,241 B1 * | 10/2005 | Gatley | 165/47 |
| 7,207,187 B2 * | 4/2007 | Funahashi et al. | 62/228.4 |
| 7,237,599 B2 * | 7/2007 | Lopatinsky et al. | 165/80.3 |
| 7,861,708 B1 * | 1/2011 | Lyons | 126/110 A |
| 2006/0192449 A1* | 8/2006 | Noda et al. | 310/88 |
| 2008/0159883 A1* | 7/2008 | Finkenbinder et al. | 417/360 |
| 2010/0144261 A1* | 6/2010 | Barkic et al. | 454/75 |
| 2011/0229349 A1* | 9/2011 | Schiel et al. | 417/321 |

FOREIGN PATENT DOCUMENTS

| | | |
|---|---|---|
| CN | 201851378 U | 6/2011 |
| DE | 4300401 A1 | 7/1994 |
| WO | WO 2008128800 A1 * | 10/2008 |

\* cited by examiner

FAN UNIT WITH HEAT TRANSFERRING CONNECTION

BACKGROUND OF THE INVENTION

The invention relates to a fan unit, in particular for an air conditioning system of a motor vehicle, comprising an electric motor for driving a fan wheel, an electronic device which generates waste heat and provides electrical current to the electric motor and a fan housing, wherein the fan wheel is disposed together with the electric motor in an air guiding region delimited by the fan housing.

Fan units of the aforementioned kind are known from prior art. They are frequently used in air conditioning systems for motor vehicles. The fan unit comprises the electric motor, the electronic device and the fan housing. The electric motor serves thereby to drive a fan wheel which is operatively connected to a rotor of the electric motor. The electronic device supplies the electric motor with electrical current or respectively operates said motor in open- and/or closed-loop control. In this respect, the electronic device particularly has power electronics at its disposal. The fan housing accommodates at least zonally, in particular completely, the fan wheel as well as the electric motor. Provision is thereby made for the fan wheel and the electric motor to be located in the air guiding region delimited by the fan housing. In an operation of the fan unit, air passes through the air guiding region, wherein the fan wheel driven by the electric motor serves to convey the air and therefore to generate an air flow through the fan housing.

The electronic device generates heat while operating the fan unit, which must be led away in the form of waste heat in order to keep the electronic device below or at a maximum temperature. It is known, for example, from prior art to provide the electronic device with a heat sink and to dispose said device in the air flow generated by the fan wheel. During the operation of the fan unit, the air delivered through the air guiding region then flows over the electronic device and therefore cools the same. The heat sink can comprise surface enlarging and/or vortex generating elements, for example ribs, knobs or the like, to increase the heat transfer. The German patent specification DE 10 2008 042 897 A1, for example, describes a fan device for a motor vehicle. Said fan device comprises a regulating device and a motor for actuating a ventilation device of the fan device. The fan device is designed such that the motor and the regulating device can be cooled by a common air flow of the ventilation device. The regulating device comprises a heat sink apparatus having a knobbed surface, wherein the regulating device is disposed in a receptacle of a housing section of the fan device such that the air flow of the ventilation device can flow to the heat sink apparatus or respectively said heat sink apparatus can be cooled.

The air flow delivered by the fan unit is frequently drawn in from an area outside of the motor vehicle. Liquid or rather moisture and dirt, for example dust and sand, are thus transported via said air flow into the fan housing. Due to temperature differences, liquid in the form of condensation can also additionally form, which then, for example, accumulates in the form of drops in regions of the fan housing, in particular at corners or ribs. That means however that the electronic device in the known embodiment from prior art has to be permanently protected from the ingress of moisture or dirt by means of an additional sealing element. At the same time, the sealing element cannot however substantially impair the cooling by means of the air flow. Due to the effects of ageing, in particular as a result of mechanical stress, temperature differences and the like, the danger then exists that moisture and/or dirt can penetrate through the seal and therefore to the electronic device. In certain circumstances, this leads to damage to or errors in the fan unit, in particular to short circuits or malfunctions in the electronic device and respectively the electric motor, or to said electronic device burning out.

SUMMARY OF THE INVENTION

In contrast, the fan unit of the invention has the advantage that a reliable cooling of the electronic device can be ensured without moisture and/or dirt from the air flow being able to penetrate to the same. This is achieved according to the invention by the electronic device being fastened in a heat transferring manner on the side of the fan housing which faces away from the air guiding region, and therefore a heat transfer connection is formed between the electronic device and the air guiding region. As a result, the air flow in the air guiding region is not directly conducted past the electronic device. Said electronic device is accordingly disposed outside of the air flow generated by the fan wheel, namely on the side of the fan housing facing away from the air guiding region.

That means that the electronic device is completely separated from the air flow in terms of flow technology. In so doing, the fan housing is exposed on one side thereof to the air flow in the air guiding region; whereas the electronic device is located on the other opposing side thereof. Only one wall of the fan housing, respectively a housing shell of the said fan housing, is then situated between the electronic device and the air guiding region. The wall is exposed to or respectively overflowed by the air flow on the side thereof facing the air guiding region, whereas the electronic device is disposed or respectively fastened in a heat transferring manner on the side of said wall facing away from the air guiding region. The fan housing completely encloses the air guiding region, has however air connections, through which air can travel to and again out of the air guiding region. The first of the air connections can in this respect be denoted as the inlet connection and the latter as the outlet connection. Provision is preferably only made for an inlet connection and an outlet connection; however a plurality of connections may also be present.

The electronic device is thereby fastened to the fan housing or respectively the housing shell in such a way that the waste heat of the electronic device is introduced into the fan housing and subsequently led out in the direction of the air guiding region. For this purpose, provision is made for the electronic device to be fastened on the fan housing in a heat transferring manner. The heat transfer connection between the electronic device and the air guiding regions is thereby formed. The fan housing can basically be manufactured from any material, in particular metal. It is however particularly preferred for the fan housing to consist completely of plastic because this facilitates a simple and cost effective manufacture, for example by injection molding. The discharge of the waste heat of the electronic device is especially achieved by the use of a heat stabilizing plastic for the fan housing. By a heat stabilizing plastic, a plastic is preferably understood which is tempered and/or has a low heat expansion coefficient or a high thermal conduction coefficient. In this respect, it is possible according to the invention to dispense with one of the heat sinks associated with the electronic device. In fact, the fan housing serves as a heat sink for the electronic device. Because a continuous element now substantially exists between the air guiding region and the electronic device, said electronic device being therefore completely decoupled from the air guiding region, neither moisture nor dirt can penetrate from the air guiding region to the electronic device.

A modification to the invention makes provision for the electronic device to be without heat sinks and to be embedded into the fan housing at least in certain regions or for a heat sink of the electronic device to be accommodated at least in certain regions in the fan housing. In a first embodiment, the electronic device is therefore disposed such that said device is partially enclosed by the fan housing. This is especially the case for components of the electronic device which generate waste heat. Provision can thereby be made for said electronic device or respectively the components thereof generating waste heat to be flatly, in particular flatly over the entire surface thereof, in contact with the fan housing in a heat transferring manner. A contact medium, which has good heat conduction properties, should be situated between said electronic device or respectively the components thereof and the fan housing. Provision can, of course, alternatively be made for said electronic device to have a heat sink, which itself projects into the fan housing or is respectively fastened in a heat transferring manner to the same. The heat sink constitutes in this respect a heat transfer element for transferring heat between said electronic device and the fan housing. The contact medium can also in this case be provided between said electronic device and the heat sink. The embedding of said electronic device into the fan housing can, for example, thereby take place in that corresponding recesses are configured during the manufacture of said fan housing, in which recesses said electronic device or respectively the heat sink is subsequently inserted. Provision can, of course, alternatively be made for said electronic device or the heat sink to be integrally cast with said fan housing.

A modification to the invention makes provision for the fan housing to have a heat transfer region and a holding region which accommodates the heat transfer region, wherein the heat transfer region is connected to the electronic device in a heat transferring manner. The fan housing or respectively the housing shell or the constituents thereof are constructed in this respect in multiple parts, in particular in two parts. The heat transfer region serves to lead the heat away from the electronic device in the direction of the heat guiding area. Said heat transfer region is retained by the holding region, in particular encompassed by the same. A part of the heat transfer connection is situated between said heat transfer region and the electronic device. This means that the two elements are in contact with each other such that the waste heat from said electronic device is led away into said heat transfer region and further in the direction of the air guiding region.

Provision is made in a modification to the invention for the heat transfer region and the holding region to be made from different materials and for the material of the heat transfer region to have a larger thermal conduction coefficient than the material of the holding region. In this respect, provision is made for the two regions of the fan housing to consist of different materials, i.e. to be materially inhomogeneous. Nevertheless they are embodied as one piece. The manufacture of a fan housing of this kind can, for example, take place by means of a two component injection molding process. In this way, it is possible to manufacture a fan housing, in which the holding region has a high degree of strength, while at the same time the heat transfer region is optimized to a good level of heat conductivity. Nevertheless, the heat transfer region and the holding region are integrally configured so that a reliable sealing connection is provided. In so doing, the material of said heat transfer region should have a larger heat conductivity coefficient than the material of the holding region in order for the waste heat of the electronic device to be reliably led away.

Provision is made in a modification to the invention for a covering element to be fastened to the fan housing, the former covering the electronic device at least in certain regions, preferably completely. The electronic device is thus arranged between the fan housing and the covering element. Said covering element is, for example, fastened to the fan housing by means of at least one screw connection. Terminals of the electronic device can be guided outwardly in said covering element. For example, terminals for the supply of electric current and/or control mode terminals are provided in said covering element, via which said electronic device is supplied with electrical current or operated by a control unit in an open- and/or closed-loop control. Said covering element serves to protect said electronic device from outside influences.

Provision is made in a modification to the invention for at least one electrical contact element to be provided between the electronic device and the electric motor, said element reaching through a wall of the fan housing. The contact element is provided for the purpose of establishing an electrical connection between the electronic device and the electric motor, wherein the electronic device and the electric motor are disposed on opposite sides of the fan housing or a housing shell of the fan housing. Said contact element reaches thereby through the wall of the fan housing or a housing shell of the fan housing. Said contact element is preferably fixedly connected to the electronic device, while the connection of said contact element to the electric motor is detachable. For example, said contact element is embodied as a straight and rigid contact pin, which is of solid construction.

Provision is made in a modification to the invention for the contact element to be sealingly enclosed by the fan housing at least in certain regions, in particular integrally cast into the fan housing. The contact element is situated in the fan housing such that no air, liquid or dirt can penetrate from the air guiding region through the fan housing to the electronic device. Provision is thereby particularly made for said contact element to be completely enclosed by the fan housing or the wall thereof at least one axial position in the circumferential direction. One of the ends of said contact element therefore is situated within the fan housing for contacting the electric motor, the other of the ends is situated outside of the fan housing for connecting to the electronic device. Between the two ends, said contact element is sealingly enclosed by the fan housing. The enclosure of said contact element by the fan housing in a sealing manner can be particularly advantageously achieved by the integral casting of said contact element into the fan housing. In this way, provision does not have to be made for a subsequent sealing of said contact element after the insertion thereof into the fan housing. In fact, said contact element is thereby enclosed in a sealing manner immediately after manufacture of the fan housing.

Provision is made in a modification to the invention for the contact element to be disposed above a maximum water line in the fan housing. As previously mentioned, moisture or liquid can penetrate into the fan unit, i.e. into the air guiding region, and collect there. The level at which liquid can maximally be present in the air guiding region is denoted as the maximum water line. The contact element is now to be disposed such that it always lies above the maximum water line; and therefore the liquid that has collected in the air guiding region can not come in contact with said contact element. This disposal of said contact element additionally prevents the liquid from penetrating along the same through the fan housing to the electronic device. The fan housing particularly comprises a liquid discharge line, via which liquid is led out of the air guiding region, for example due to the effect of gravity. The liquid discharge line is then configured such that the level of liquid in the air guiding region can not climb above the maximum water line.

Provision is made in a modification to the invention for the electric motor to be attachable to the contact element. As already previously mentioned, the electrical connection between the electric motor and the contact element needs to be detachable. This is preferably achieved by the electric motor being plugged onto said contact element which is fixedly disposed in the fan housing. In so doing, said contact element reaches through the fan housing and projects with one end thereof into the air guiding region. During assembly of the fan unit, the electric motor is disposed together with the fan wheel in the air guiding region. In the process, the electric motor is plugged onto said contact element.

Provision is made in a modification to the invention for the fan wheel to be part of a rotor of the electric motor. The fan wheel is therefore not connected to the electric motor via an additional operative connection. On the contrary, said fan wheel is directly fastened to the rotor or is configured as a part of the same. In this way, a simple and cost effective manufacture of the rotor and respectively said fan wheel is achieved. In this regard, particularly the electric motor is plugged onto the contact element together with said fan wheel during assembly of the fan unit.

BRIEF DESCRIPTION OF THE DRAWINGS

The invention is explained in detail below using the exemplary embodiments depicted in the drawings without the invention being limited thereto. In the drawings.

DETAILED DESCRIPTION

Figure 1:
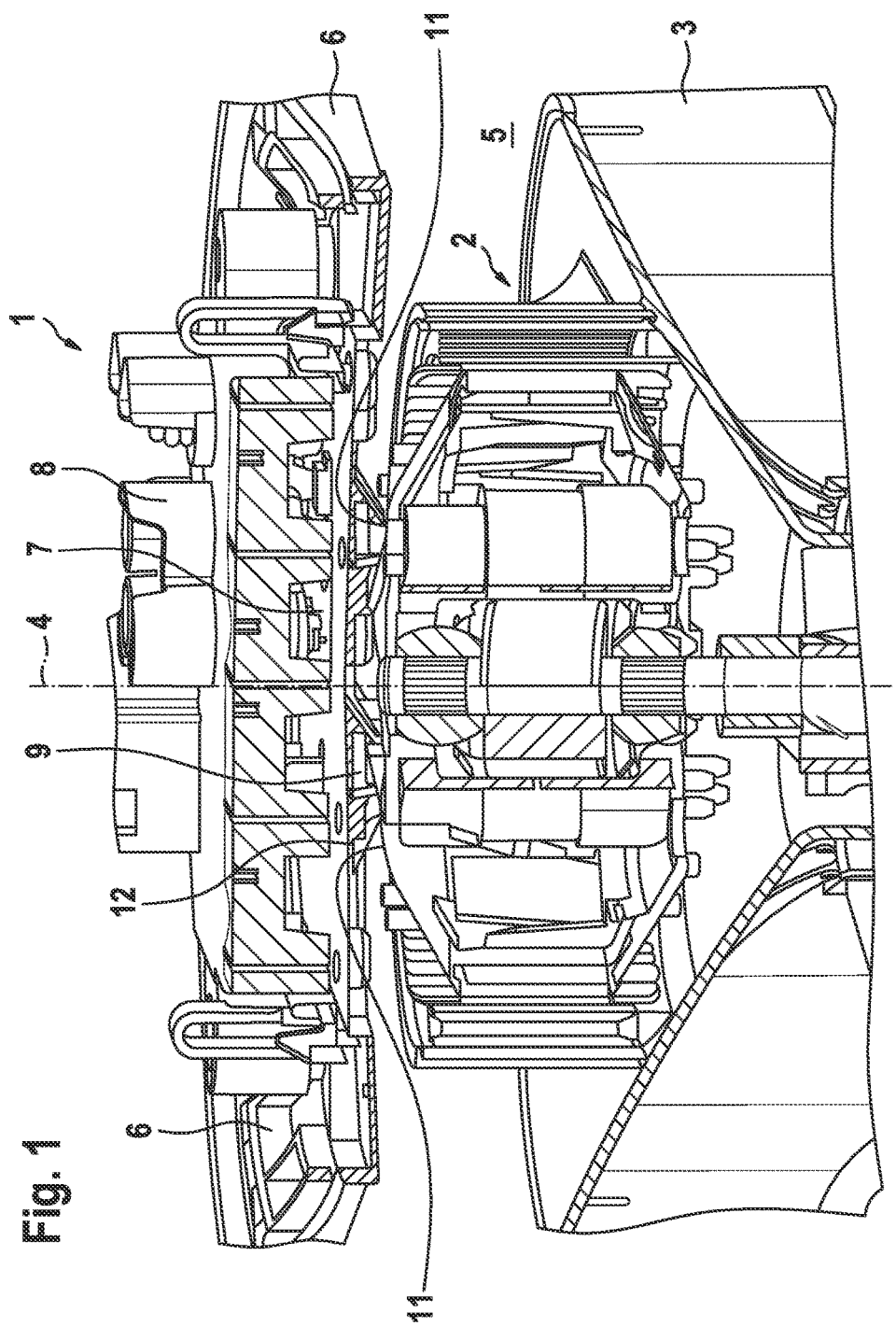
FIG. 1 shows a cross-sectional depiction through a region of a fan unit.

FIG. 1 shows a region of a fan unit 1, as said device is preferably used in an air conditioning system of a motor vehicle. The fan unit 1 has an electric motor 2 at the disposal thereof, which serves to drive a fan wheel 3. The fan wheel 3 can either be an axial, radial or mixed flow fan wheel. In the exemplary embodiment shown here, a mixed flow fan wheel 3 is used. This represents a combination of an axial and radial fan wheel. An axial section of the fan wheel 3 draws in air in the direction running parallel to a longitudinal axis 4. From the axial section, air enters into a radial section of the fan wheel 3 and flows out of the same substantially in the radial direction and therefore in a direction perpendicular to the longitudinal axis 4. In the depicted embodiment, the electric motor is presented as an external rotor motor, wherein a stator of said electric motor is disposed in the radial direction on the interior side and a rotor on the exterior side. The fan wheel 3 is now fastened to the rotor and is thus in operative connection with the same.

The electric motor 2 and the fan wheel 3 are disposed in an air guiding region 5, through which air passes during an operation of the fan unit 1. The air guiding region 5 is delimted by a fan housing 6 which is only partially depicted here. The illustrated part of the fan housing 6 can, for example, serve as a cover for further regions of the fan housing 6, which cover can be inserted into a recess of the further regions. The fan housing 6 comprises in this case air connections, which are not shown and through which air is drawn into the air guiding region (inlet connection) and can again be discharged (outlet connection). An electronic device 7 is associated with the electric motor 2. Said electronic device supplies electrical current to the electric motor 2 or respectively takes over an open-loop or closed-loop control of said electric motor 2. Said electronic device 7 can in this respect be designed as a control or regulating device. Said electronic device 7 usually comprises power electronics, which produce waste heat during operation of the fan unit. This waste heat must be led away from said electronic device 7 in order to facilitate a reliable operation of the fan unit 1. For this purpose, said electronic device 7 is fastened on the side of the fan housing 6 facing away from the air guiding region 5 in a heat transferring manner. At the same time, said electronic device is covered at least in certain regions by a covering element 8, which itself is fastened to the fan housing 6. Terminal connections of said electronic device 7 can be guided to the outside by the covering element 8.

The electronic device 7 is particularly preferably designed without heat sinks, i.e. does not have a heat sink at its disposal. Said device is to be embedded at least in certain regions thereof into the fan housing 6 in order to establish a heat transfer connection. A part of the heat transfer connection is situated particularly between a heat transfer region 9 of the fan housing and said electronic device 7. The heat transfer region 9 is encompassed by a holding region 10 of the fan housing 6. Said heat transfer region 9 and the holding region 10 can be materially homogenous and formed integrally with each other; however a materially inhomogeneous embodiment is preferred, in which said heat transfer region 9 consists of a material which has a larger heat conductivity coefficient than the material of the holding region 10. In this way, a particularly good heat transfer connection between said electronic device 7 and said heat transfer region 9 or respectively the air guiding region 5 is ensured. The waste heat of said electronic device 7 should in this respect be discharged through the fan housing 6 or said heat transfer region 9 thereof in the direction of the air guiding region 5. Said heat transfer region 9 is accordingly embodied as a heat conducting region because it guides the heat quantity, which is introduced thereinto from said electronic device 7, in the direction of the air guiding region 5.

An electrical connection between the electronic device 7 and the electric motor 2 is established via electrical contact elements 11, of which only two can be seen here. Provision is however made for a total of four contact elements, which are disposed so as to be symmetrically distributed about the longitudinal axis 4. The contact elements 11 reach through the fan housing 6 from the side on which the electronic device 7 is disposed to the side on which the electric motor 2 is situated. In this respect, said contact elements completely reach through a wall of a housing shell 12 of the fan housing 6 from the outside to the inside. In order to prevent air, liquid or dirt out of the air guiding region 5 from penetrating along the contact elements 11 to the electronic device 7, said contact elements 11 are sealingly enclosed by the fan housing 6. This is preferably implemented by said contact elements 11 being integrally cast into said fan housing 6 during the manufacture thereof. At the same time, said contact elements 11 are disposed such that they always lie above a maximum water line (not indicated here) of the fan unit 1. Said contact elements 11 are connected in a preferred manner rigidly to the electronic device 7, for example by soldering or the like. On the other hand, the electrical connection between the contact element 11 and the electric motor 2 needs to be detachable. For this purpose, the electric motor 2 can be plugged onto the contact elements 11.

Figure 2:
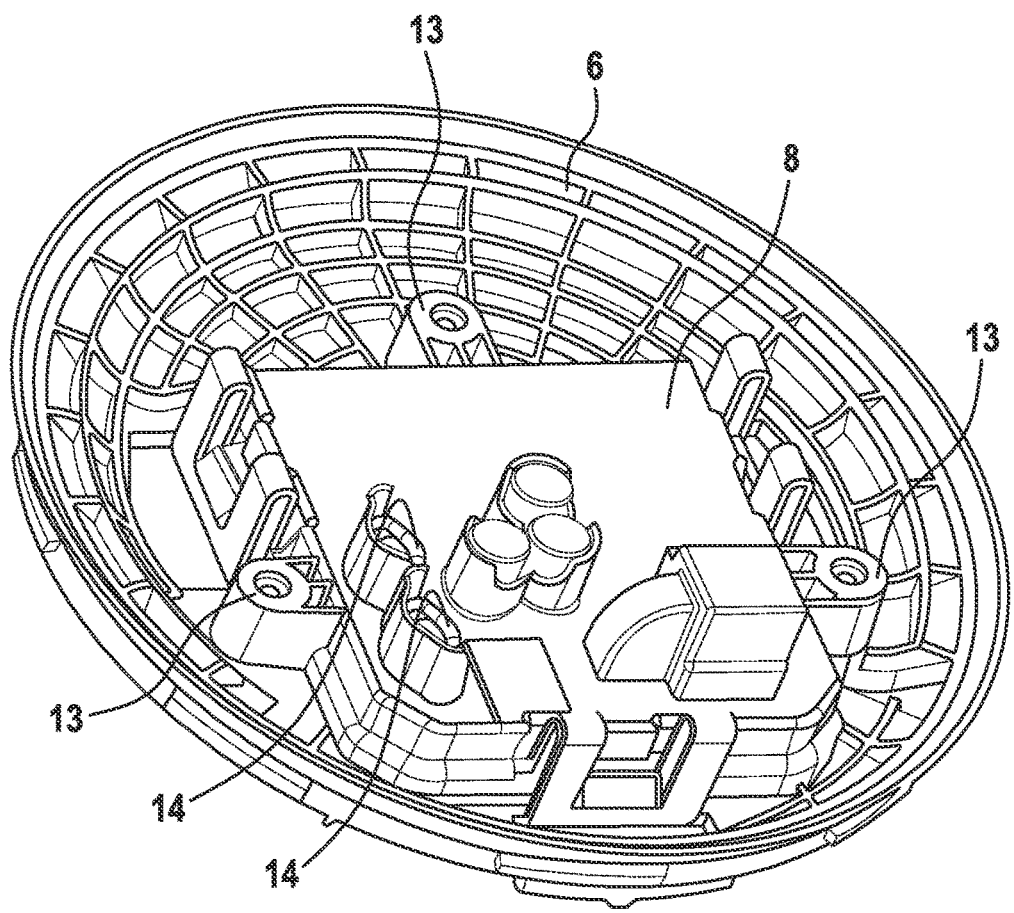
FIG. 2 shows a region of a fan housing of the fan unit comprising a covering element fastened to said region.

FIG. 2 shows a region of the fan housing 6 having a covering element 8 fastened thereto. The covering element 8 is preferably fastened to the fan housing 6 by means of screw connections 13. Electrical contacts 14 are provided on said covering element 8, via which contacts an electrical contacting of the electronic device 7 is possible, for example for the purpose of connecting to a control unit or the fan unit 1. The contacts 14 are in this respect configured as plug contacts for receiving plugs.

Figure 3:
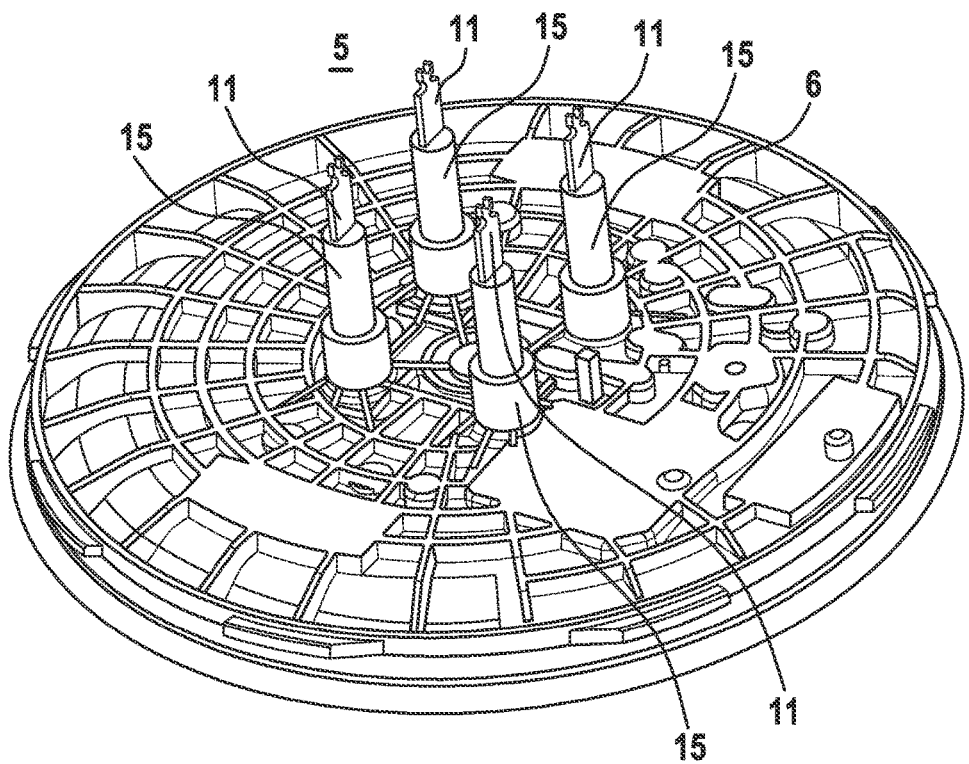
FIG. 3 shows the region of the fan housing from the vantage point of an air guiding region.

FIG. 3 shows a view of the region of the fan housing 6 on the side facing the air guiding region 5. It is clear that the contact elements 11 run through the fastening elements 15 which extend into the air guiding region 5 and in this way enter into said air guiding region 5. The fastening elements 15 serve to fasten the electric motor 2 to the fan housing 6. At the same time, said fastening elements, because they receive the contact elements 11, serve to electrically contact the electric motor 2 by means of the electronic device 7. In this way, a simultaneous fastening and an electrical contacting of the electric motor 2 and correspondingly a faster assembly of the fan unit 1 are possible.

The invention claimed is:

1. A fan unit (1), comprising an electric motor (2) for driving a fan wheel (3), an electronic device (7) which generates waste heat and provides electrical current to the electric motor (2) and a fan housing (6), wherein the fan wheel (3) is disposed together with said electric motor (2) in an air guiding region (5) delimited by the fan housing (6), wherein the electronic device (7) is fastened to a side of the fan housing (6) facing away from the air guiding region (5) in a heat transferring manner so that a heat transfer connection is formed between said electronic device (7) and said air guiding region (5), and further wherein a plurality of electrical contact elements is provided between the electronic device and the electric motor, each electrical contact element passing through a fastening element extending into the air guiding region, wherein the fastening elements are configured to fasten the electric motor to the fan housing and concurrently electrically contact the electric motor and the electronic device.

2. The fan unit according to claim 1, wherein the electronic device (7) is without a heat sink and is embedded into the fan housing.

3. The fan unit according to claim 1, wherein the fan housing (6) comprises a heat transfer region (9) and a holding region (10) accommodating the heat transfer region (9), wherein said heat transfer region (9) is connected to the electronic device (7) in a heat transferring manner.

4. The fan unit according to claim 3, wherein the heat transfer region (9) and the holding region are materially inhomogeneous, and the material of the heat transfer region (9) has a larger thermal conduction coefficient than the material of the holding region (10).

5. The fan unit according to claim 1, wherein a covering element (8) is fastened to the fan housing (6), the covering element covering the electronic device (7).

6. The fan unit according to claim 1, wherein each electrical contact element extends through a wall of the fan housing (6).

7. The fan unit according to claim 6, wherein each contact element (11) is sealingly enclosed by the fan housing (6).

8. The fan unit according to claim 6, wherein each contact element (11) is disposed above a maximum water line of the fan unit (1).

9. The fan unit according to claim 6, wherein the electric motor (2) can be plugged onto the contact elements (11).

10. The fan unit according to claim 1, wherein the fan wheel (3) is part of a rotor of the electric motor (2).

11. The fan unit according to claim 1, wherein a heat sink of the electronic device (7) is accommodated by the fan housing (6).

12. The fan unit according to claim 1, wherein a covering element (8) is fastened to the fan housing (6), the covering element completely covering the electronic device (7).

13. The fan unit according to claim 6, wherein each contact element is integrally cast into said fan housing (6).

* * * * *